July 5, 1966 D. R. AYER 3,259,860

TRANSMISSION LINE PACKAGING COMPONENTS

Original Filed July 7, 1960 2 Sheets-Sheet 1

Donald R. Ayer
INVENTOR.

ATTORNEY

July 5, 1966 D. R. AYER 3,259,860

TRANSMISSION LINE PACKAGING COMPONENTS

Original Filed July 7, 1960 2 Sheets-Sheet 2

Donald R. Ayer

INVENTOR

ATTORNEY

United States Patent Office 3,259,860

Patented July 5, 1966

3,259,860
TRANSMISSION LINE PACKAGING COMPONENTS

Donald R. Ayer, Nashua, N.H., assignor to Sanders Associates, Inc., Nashua, N.H., a corporation of Delaware Original application July 7, 1960, Ser. No. 41,420. Divided and this application Feb. 6, 1964, Ser. No. 343,058

4 Claims. (Cl. 333—84)

Figure 1:
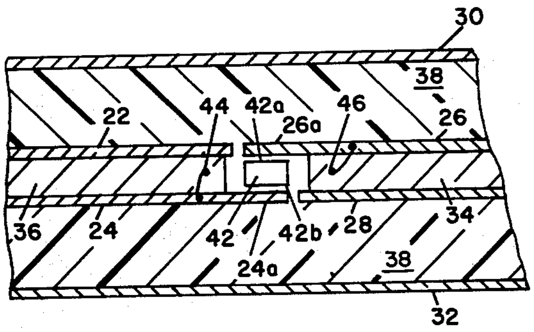

This application is a division of my co-pending application Serial No. 41,420, filed July 7, 1960, now abandoned.

This invention relates to the art of high frequency electronic assemblies. More particularly, it relates to assemblies in which controlled circuit elements are incorporated in strip transmission lines. This minimizes the effect of such factors as lead inductance and capacitance and reduces the size of assemblies to a level commensurate with the sizes of the various circuit elements as well as the wavelengths at which these elements are capable of operating.

My invention is of particular utility in circuits using small, active components such as various types of high frequency transistors and tunnel or Esaki diodes. These components are usually packaged in housings which may be considered quite small when compared to such elements as vacuum tubes. However, at wavelengths of ten centimeters or less, the lengths of the leads required in such housings result in appreciable inductive reactance. Various capacitances involving the leads and housings are also present. These lumped reactances generally adversely affect transfer of energy between an element and the rest of the circuit in which it is connected. Furthermore, in some combinations, the reactances can form resonant feedback loops, resulting in undesirable oscillations.

It should also be noted that the size of the active element itself is usually much less than that of the packaged unit. Thus, the potential savings in space attendant on the use of these elements have not been fully realized prior to my invention.

Accordingly, it is a principal object of my invention to provide an improved high frequency circuit construction adapted to utilize the maximum capabilities of various controlled circuit elements incorporated therein.

Another object of my invention is to provide a circuit construction of the above character in which the various elements are interconnected by means of sections of transmission line.

A further object of my invention is to provide a high frequency circuit construction adapted for greater realization of the potentialities of miniature circuit elements such as transistors and tunnel diodes.

A more specific object of my invention is to minimize the effects of lead inductances and capacitances normally associated with the use of such elements. It is also desirable to take advantage of the small sizes of the operating portions of such elements.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

In general, my invention incorporates various controlled circuit components or elements in strip transmission line, with the conductors of the transmission line serving also as leads for the components. The preferred transmission line is of the type disclosed in U.S. Patents No. 2,810,892, which issued Oct. 22, 1957, to Daniel Blitz for "Transmission Line," and No. 2,812,504, which issued Nov. 5, 1957, to D. J. Sommers for "Transmission Line," wherein a center conductor is disposed midway between a pair of outer ground plane conductors. The elements are connected to the center conductor of the line in a variety of configurations. They may be in series with this conductor and thus in series with the transmission line itself, or they may be connected across the line, between the center and ground plane conductors. The elements may also be disposed between the two conducting strips of a double or split center conductor.

Furthermore, the elements may be packaged in the transmission line itself without the use of an intervening housing. The signal-carrying leads are the transmission line conductors, and, thus, assuming proper impedance matching, there is negligible introduction of unwanted reactances. Furthermore, the cost of the housing and associated internal leads is eliminated, and the full space saving potential of these elements is realized by my construction.

Figure 2:
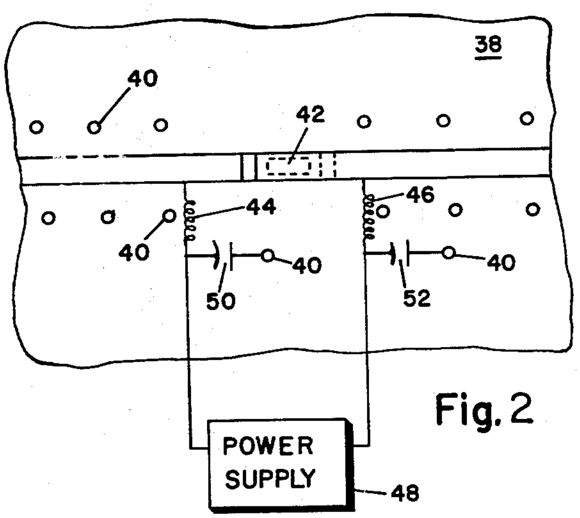
Figure 3:
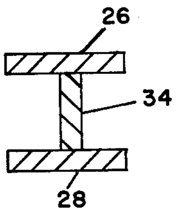
Figure 4:
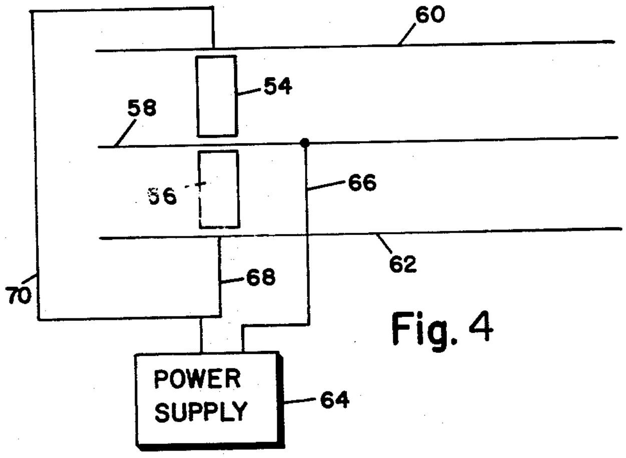
Figures 5, 6, 7, 8:
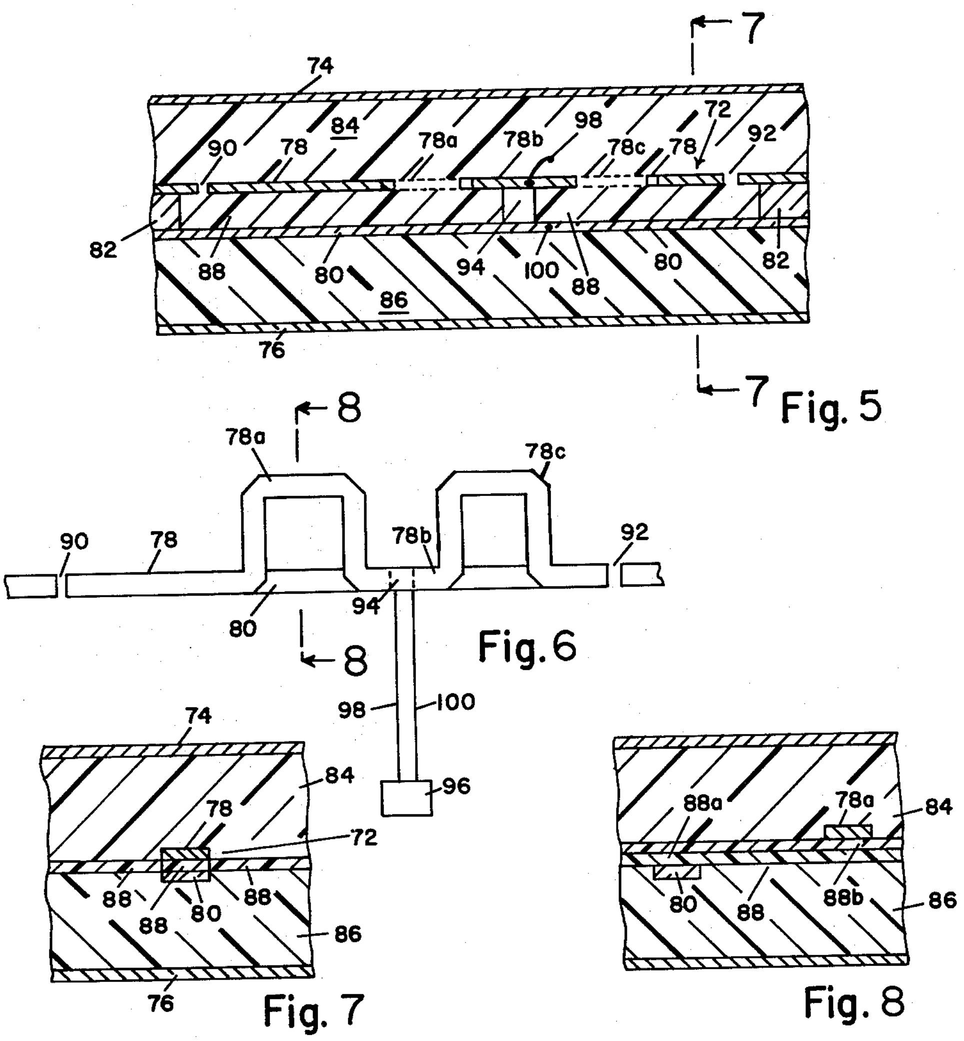
Figure 9:
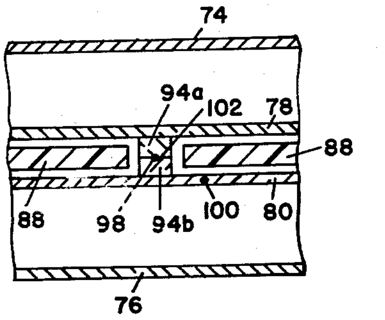

For a fuller understanding of the nature and objects of the invention, reference should be had to the following detailed description taken in connection with the accompanying drawings, in which:

FIGURE 1 is a simplified longitudinal vertical section of a transmission line unit incorporating a tunnel diode in accordance with the principles of my invention, FIGURE 2 is a plan view of the unit shown in FIGURE 1, including a schematic representation of a system for powering the tunnel diode, FIGURE 3 is a cross section of a center conductor configuration which may be used in the transmission line of FIGURES 1 and 2, FIGURE 4 is a schematic representation of a transmission line unit incorporating a pair of tunnel diodes disposed between the center conductor and the ground plane conductors, FIGURE 5 is a simplified longitudinal vertical section of another embodiment of my invention in which a controlled element is disposed between a pair of center conductor strips functioning in a parallel plate mode in the vicinity of the element and in a conventional strip line mode farther away therefrom, FIGURE 6 is a plan view of the conducting strips shown in FIGURE 5, including a schematic representation of a system for controlling a characteristic of the element, FIGURE 7 is a transverse section taken along line 7—7 of FIGURE 5, FIGURE 8 is a transverse section taken along line 8—8 of FIGURE 6, and FIGURE 9 is a fragmentary longitudinal section, similar to the central portion of FIGURE 5, and illustrating the incorporation of a pair of serially connected controlled elements between the two conducting strips of the center conductor.

As seen in FIGURES 1 and 2, a transmission line unit incorporating the features of my invention may include a center conductor comprising a pair of strips 22 and 24 and a second pair of strips 26 and 28 disposed between a pair of ground plane conductors 30 and 32. As seen in FIGURE 3, the strip pair 26–28 is preferably joined by a conducting spacer 34 to insure equipotential condition throughout the pair. The pair of strips 22–24 is similarly connected by a spacer 36 (FIGURE 1). In the drawings, the relative dimensions have been exaggerated for purposes of clarity. It should be realized that the center strips 22, 24, 26 and 28 may be in the form of thin films bonded to insulating material 38 which pervades the space between the ground plane conductors 30 and 32. Similarly, the spacers 34 and 36 have heights which are only as great as required for incorporation of circuit elements in the matter described below. Ordinarily, this will be a matter of a few thousands of an inch. As seen in FIGURE 2, the unit is also provided with shorting pins 40 interconnecting the ground planes 30 and 32 (FIGURE 1).

As best seen in FIGURE 1, the strips 22 and 28 and spacers 34 and 36 are cut away, so that the strips 24 and 26 may overlap as shown at 24*a* and 26*a*. This provides a shielded region in which an electrically controllable element 42 may be mounted. The portions 24*a* and 26*a* serve as contacts or leads for a controlled element 42 disposed between them. By way of example, the element 42 may be a tunnel diode in which an input signal is applied across faces 42*a* and 42*b*, contacting the portions 26*a* and 24*a*; output current and bias current are also passed through the diode by way of these faces.

The controlling bias for the element 42 is supplied through conductors 44 and 46 connected to the strips 24 and 26 and extending laterally outward from the center conductors. The conductors 44 and 46 extend past the pins 40 into a region essentially free from the fields within the transmission line and connect with a power supply 48. They are preferably of fine wire, which presents an inductive reactance materially greater than the characteristic impedance of the transmission line. Thus, they have little effect on the properties of the line at the frequencies propagated therein. Bypass capacitors 50 and 52 may be connected between the conductors 44 and 46 and the shorting pins 40.

The power supply 48 provides a control voltage or current appropriate for the particular element 42 used in the unit and the mode of operation of the element. For example, in the case of a tunnel diode used as an amplifier, the power supply will provide a direct current for biasing. If the diode is to operate as a mixer, the power supply may be, in effect, a local oscillator.

The controlled element 42 of FIGURES 1 and 2 is electrically in series with the transmission line. Elements such as tunnel diodes may also be operated in parallel with the line. Thus, as illustrated in FIGURE 4, a pair of elements 54 and 56 are disposed between a center conductor 58 and a pair of ground plane conductors 60 and 62. A power supply 64 is connected to the center conductor 58 by a conductor 66, constructed and connected in a manner similar to the conductors 44 and 46 of FIGURE 2. A conductor 68 connects the power supply to the ground plane conductor 62, and the connection between the ground plane conductors 60 and 62, made by the shorting pins described above (not shown in FIGURE 4), is schematically indicated by a conductor 70. Thus, the elements 54 and 56 operate in parallel with each other and across the transmission line. The use of two such elements eliminates the problem of unbalance which will result if a single one of the elements is connected between the center conductor 58 and one of the two ground plane conductors.

FIGURES 5–9 illustrate another embodiment of my invention in which the controlled element is disposed in a section of strip transmission line operating in a parallel plate mode. As seen in FIGURES 5 and 7, a double center conductor section, operating as a strip transmission line, consists of a center conductor, generally indicated 72, disposed midway between a pair of ground plane conductors 74 and 76. The center conductor includes a pair of conducting strips 78 and 80 separated by a spacer 82, preferably, though not necessarily, of metallic material. The strips 78 and 80 are preferably in the form of thin films bonded to insulators 84 and 86, to which the ground plane conductors 74 and 76 are also bonded.

Proceeding from left to right in FIGURES 5 and 6, the conductive spacer 82 is followed by a spacer 88 of insulating material, and the strip 78 is interrupted to form a gap 90. At the right ends of FIGURES 5 and 6, the spacer 88 is succeeded once again by the metallic spacer 82, and the conductor 78 is interrupted again by a gap 92. Thus, between the gaps 90 and 92, the strips 78 and 80 are fully insulated from each other, except for various circuit components which may be inserted between them.

Continuing to the right from the gap 90, the strip 78 moves away from the strip 80 in a loop 78*a*, whose length is a half wave-length at the frequency of operation. Following the loop 78*a* is a section 78*b*, where the strip 78 once again is in registration with the strip 80. Finally, the strip 78 forms a second half wavelength 78*c*.

FIGURE 8 illustrates a preferred construction of the transmission line in the half wavelength loops. As shown therein, the strip 80 and loop 78*a* are positioned in the insulators 84 and 86 in the same manner as in FIGURE 7. The spacer 88, however, is in two parts, 88*a* and 88*b*, conforming to the adjoining surfaces of the insulators.

The loops 78*a* and 78*c* provide transitions from the strip line mode of propagation described above to a parallel plate mode and then back again to the first strip line mode. Thus, assuming energy is passing from left to right in FIGURES 5 and 6, the unit operates in the strip line mode, with the center strips 78 and 80 at the same potential, until the loop 78*a* is reached. The loop inserts a half wavelength delay in the conductor 78, so that, at the end of the loop, the strips 78 and 80 are in phase opposition. This condition exists throughout the section 78*b*, and, thus, in this section, the strips operate as a parallel line or, more specifically, a parallel plate transmission line section. Finally, the loop 78*c* inserts a second half wavelength delay in the conductor 78, so that, following this loop, the strips 78 and 80 are again at the same potential. This results in a return to the first strip line mode of propagation.

Although both half wavelength loops have been shown in a single center strip, the strip 78, it may often be desirable to have one loop in the strip 78 and the other in the loop 80. For example, if the frequency differs from the value providing exactly a half wavelength delay in each loop, the total delay in the loops 78*a* and 78*c* will differ from a full wavelength. Thus, after passing through the loops and the corresponding portions of the strip 80, energy will not be in phase, with equal potentials on the strips 78 and 80, except as forced by the conducting spacer 82. Undesirable reflections will therefore occur at this point, i.e., adjacent to the gap 92 when propagation is from left to right in FIGURES 5 and 6. If the two loops are in different strips, this situation will not arise, since the energy is then retarded by the same amount in each of the strips 78 and 80.

In the parallel plate section 78*b*, the spacer 88 is interrupted to provide for a controlled element 94, which, in the first instance, may be considered to be a tunnel diode. A control source 96 is connected to the strips 78 and 80 by thin conductors 98 and 100, similar to the conductors 44 and 46 of FIGURE 2. The gaps 90 and 92 isolate the portion of the strip 78 connected to the source 96 for direct current as well as relatively low frequency alternating current and thus facilitate application of a control voltage or current to the element 94. It will be noted that the element 94 is electrically in parallel with the transmission line in this embodiment. However, a second element is not required for balance, as in the configuration of FIGURE 4.

As seen in FIGURE 9, the controlled element 94 may also comprise a pair of electrically controllable capacitors 94*a* and 94*b* separated by a metallic film 102 (FIGURE 5). The capacitors 94*a* and 94*b* may, for example, be of a ceramic material such as barium titanate, whose dielectric constant can be varied by the application of an electric field thereto. The conductor 98 from the power source 96 (FIGURE 6) is connected to the foil 102 and the conductor 100 to the strip 78 or 80. In this embodiment, the strip 78 is continuous, i.e., there are no gaps 90 or 92, and, thus, the center conductors are at the same potential as regards the controlling voltage from the source 96.

The capacitors 94*a* and 94*b*, in series across the parallel plate section 78*b* of the transmission line, form a composite capacitor which may be used as part of a variable filter. The two capacitors are so polarized that they exhibit the same direction of capacitance change (increase or decrease) when the instaneous voltage from the source 96 changes.

An advantage of the arrangement shown in FIGURE 9 is that the lead 98 is connected midway between the strips 78 and 80 and extends outwardly therefrom in a plane parallel to the ground plane conductors 74 and 76. Since the center strips operate in a parallel plate mode in this region, this plane coincides with an equipotential with respect to the conductors, and, more particularly, it is a neutral plane. Thus, the conductor 98 will have essentially no disturbing influence on the fields associated with propagation along the parallel plate line. The conductor 100, which is shown schematically connected to the strip 80 near the capacitors **94*a* and 94*b***, may actually be connected some distance therefrom near a termination of the line, where it too will have negligible effect on transmission characteristics.

It will be understood that the presence of a controlled element in the transmission line will ordinarily affect the characteristic impedance of the line. In many cases, it will be desirable to make use of standard impedance matching techniques to maximize transmission of energy in portions of the line incorporating these elements. For example, in the case of a tunnel diode, quarter-wave transformers may be used on each side of the diode to match the impedance characteristics thereof to those of the rest of the line.

Another technique, which may, in some cases be preferable because of its relative independence of frequency, is to use the characteristic impedance on the output side of the diode which provides for greatest energy transfer therefrom, and a characteristic impedance on the input side, matching the combination of the diode and the first characteristic impedance. In this case, there will be an impedance "match" for energy running in the output direction and a mismatch for energy travelling in the reverse direction. This will often be quite desirable, since a tunnel diode ordinarily transmits energy equally in both directions therefrom, thereby wasting half its power output by transmitting it in the direction of its input. Use of such an impedance matching and mismatching arrangement can thus result in the propagation of the preponderance of output energy in the desired output direction. In connection with the problem of impedance matching, it is noted that a tunnel diode operating as a linear amplifier has a negative dynamic resistance.

When a number of controlled elements are to be incorporated in a single transmission line, isolation of the various control sources will often be required. This may be accomplished by an arrangement similar to that illustrated in FIGURE 1, with the controlled element 42 replaced by a high dielectric constant material forming a capacitor between the sections of the center conductor to the left and right thereof. Preferably, the capacitor extends across both gaps between the various strips, thus engaging all four of the latter. With narrow gaps and a high dielectric constant, there will be a negligible impedance in series between the right-hand and left-hand sections at microwave frequencies. For direct current and low frequencies, however, the two sections will be isolated from each other. Thus, isolation units of this type may be inserted on each side of a controlled element to isolate its control circuits from the rest of the line.

Since the propagation of energy along a transmission line is a function of the electric and magnetic fields, it will be apparent that the controlled elements contemplated herein affect these fields in one way or another. More specifically, each of the elements has a characteristic, e.g., capacitance or resistance, controlled by a control source which ordinarily provides a biasing voltage or current. In the case of an amplifier, the instantaneous value of the controlled characteristic also depends on the instantaneous value of the input signal.

Thus, I have described an improved high frequency circuit construction in which various controlled elements are incorporated in sections of strip transmission line. The controlled elements, which may be tunnel diodes or electrically variable capacitors, as described above, or other elements including transistors and variable capacity diodes, are connected to the center conductor of the transmission line and may be in series with this conductor or in parallel with the line between the center conductor and a ground plane conductor. In one of the embodiments described above, the element is disposed between the two strips of a double center conductor which operates as a parallel plate transmission line in the region adjacent to the element and as the center conductor of a strip line at distances more remote therefrom.

The various elements may be incorporated in the line without any intermediate housing, thus eliminating signal leads over than conductors of the transmission line itself. The problems of lead inductance and capacitance inherent in prior systems are thereby materially reduced. Furthermore, with the elimination of the housing structure, the ultimate potential in reduction of space requirements may be realized.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A high frequency circuit unit comprising, in combination, a strip transmission line including a center conductor disposed between a pair of ground plane conductors, an electrically controllable diode disposed between and in contact with said center conductor and one of said ground plane conductors and means connected to said center conductor and said one ground plane conductor for electrically controlling said diode, a second controllable diode having substantially the same characteristics as said first diode and connected in registration with said first diode between and in contact with said center conductor and the other of said ground plane conductors, and means effectively connecting together said ground plane conductors for the energy from said controlling means.

2. A high frequency circuit unit comprising, in combination, a strip transmission line including first and second conducting strips spaced apart from each other and disposed between a pair of ground plane conductors, said unit including a first section in which said strips are in registration with each other, an insulating medium disposed between said strips in said first section, a second section connected to one end of said first section, said strips being in registration at the ends of said second section and one of said strips being an odd number half wavelengths longer than the other in said second section, a third section similar to said second section and having one end connected to the other end of said first section, fourth and fifth sections connected to the other ends of said second and third sections, said first and second conducting strips being in registration in said fourth and fifth sections, means for maintaining said first and second strips at substantially the same potential in said fourth and fifth sections, an element having a controllable electrical characteristic disposed between and connected to said first and second conducting strips in said first section, said characteristic affecting the fields in said first section, and means for electrically controlling said characteristic of said controllable element.

3. The combination defined in claim 2 including means forming gaps in at least one of said first and second strips to isolate said first section from said fourth and fifth sections for energy from said controlling means and thin conductors extending transversely from said first and second strips in said first section to connect said controlling means to said element.

4. The combination defined in claim 2 in which said controllable element includes a pair of units connected in series with a conductor disposed between them, a lead conductor extending transversely of said line from said conductor to connect said conductor to said controlling means and further conducting means connecting said controlling means to said first and second strips in said first section.

References Cited by the Examiner

UNITED STATES PATENTS

| | | | |
|---|---|---|---|
| 2,934,723 | 4/1960 | Hewitt | 333—84 |
| 2,954,468 | 9/1960 | Matthaei | 333—84 |
| 3,051,844 | 8/1962 | Beam et al. | 333—84 |

OTHER REFERENCES

Sterzer, Proceedings of the IRE, August 1959, pages 1317–1324 relied on.

HERMAN KARL SAALBACH, *Primary Examiner.*

R. F. HUNT, *Assistant Examiner.*